Patented Feb. 20, 1951

2,542,069

UNITED STATES PATENT OFFICE 2,542,069

SUSPENSIONS OF POLYMERIC CHLORO-TRIFLUOROETHYLENE

Gerald W. Young, Schenectady, N. Y., assignor to General Electric Company, a corporation of New York No Drawing. Application November 25, 1949, Serial No. 129,520

20 Claims. (Cl. 260—33.4)

This application is a continuation-in-part of the copending joint application, Serial No. 54,636, in the names of Edward J. Flynn and the present applicant, filed October 15, 1948, which application is assigned to the same assignee as the present invention.

The invention relates to suspensions of polymeric chlorotrifluoroethylene. More particularly, the invention relates to a suspension comprising (1) a dispersed phase of polymeric chlorotrifluoroethylene and (2) a dispersing medium comprising (a) a liquid saturated, aliphatic monohydric alcohol and (b) a relatively high boiling organic, liquid mixture of alkylated aromatic hydrocarbons obtained, e. g., in the cracking or distillation of various coal tar fractions or in the hydroforming of select petroleum fractions. The invention also embraces methods for preparing the above-described suspensions.

Polymeric chlorotrifluoroethylene has been found to have good heat resistance and chemical resistance and because of this is eminently suitable for many applications where such properties are desired. Electrical conductors insulated with polymeric chlorotrifluoroethylene are capable of withstanding temperatures of the order of from about 150° to 200° C. for long periods of time with little change in the physical characteristics or the insulating properties of the polymeric insulation. Such polymeric material is also highly desired for many applications where its high softening point is an advantage. Thus, it is possible to mold various objects from the polymeric chlorotrifluoroethylene, either with or without fillers, to give useful articles which are dimensionally stable over a wide temperature range.

Because of its extreme chemical resistance and substantial insolubility in many of the common organic solvents, great difficulty has been experienced in obtaining the polymeric chlorotrifluoroethylene in usable form whereby it can be employed for coating or impregnating applications. Many attempts have been made to form solutions of the polymeric chlorotrifluoroethylene, but these have generally been unsuccessful because the limit of solubility of the polymeric chlorotrifluoroethylene in the solvent has been so small as to render it impractical. Attempts to prepare dispersions of polymeric chlorotrifluoroethylene have also been generally unsuccessful because of the poor stability of such dispersions due apparently to the dispersing phases used.

I have now discovered that for the first time it is possible to make substantially stable suspensions of polymeric chlorotrifluoroethylene using as a dispersing medium relatively inexpensive liquids. More particularly, I have discovered that I am able to make stable suspensions of polymeric chlorotrifluoroethylene by first comminuting the polymeric material, for instance, in a micropulverizer, to a fine particle size, thereafter mixing the finely divided polymer with a dispersing phase comprising (a) a saturated aliphatic monohydric alcohol, preferably one having a boiling point above 50° C., for example, above 100° C., and (b) a high boiling (e. g., above about 100° C.) organic liquid mixture of alkylated aromatic hydrocarbons obtained in the cracking of various coal tar fractions, or in the hydroforming of select petroleum fractions, for instance, high-flash naphtha (which is a mixture of alkylated benzenes), solvent naphtha, the various Solvessos, etc., and finally grinding this mixture, for example, in a pebble mill for a time sufficient to yield a stable suspension.

Suspensions made in accordance with my above-described method are uniformly stable over long periods of time. In addition, even if there should be some slight settling out of the suspended polymeric material, it is possible by mere stirring, either prior to use or during use, to reinstate the suspension to its originally acceptable form.

In carrying out the invention, the polymeric chlorotrifluoroethylene is cut up or ground into small pieces and ground still further into small particles by running it through, for example, a hammer mill to comminute it further into small particles. Thereafter the comminuted polymer powder is mixed with the dispersing liquid medium and put in a pebble mill and milled for a sufficient length of time until a homogeneous, fine suspension or dispersion results. The suspension obtained in this manner is quite stable and may be maintained in a homogeneous state by slight agitation.

In making the suspensions, a large number of liquid organic dispersing media may be employed. Thus, I may use such organic liquids as high-flash naphtha mixed with various saturated aliphatic monohydric alcohols, for instance, butyl alcohol (e. g., n-butanol, etc.), benzene, toluene, xylene, various glycols such as ethylene glycol, ethyl Cellosolve, diethyl Cellosolve, etc.

Among the mixtures of liquid organic alkylated aromatic hydrocarbons which I may use are those obtained, for instance, (1) by the cracking and distillation of the volatile portions of coal tar and (2) mixtures of alkylated aromatic hydrocarbons obtained by the cracking and hydroforming and subsequent distillation of light petroleum oils, etc. An example of a mixture of alkylated aromatic hydrocarbons obtained from coal tar comprises materials called "Hi-Flash" naphtha (also called "High Flash" naphtha) whose boiling range may be from about 135° C. to 195° C., depending upon the cut taken during distillation. Thus, one such fraction may have a boiling range of 140° C. to 180° C. while another fraction may boil from about 150° C. to 175° C. A typical analysis of Hi-Flash naphtha comprises the following ingredients in stipulated per cents, by weight:

| | Percent |
|---|---|
| Ethylbenzene, xylene, cumene, propylbenzene, ethyltoluene | 10 |
| Trimethylbenzene | 45 |
| Tetramethylbenzene | 40 |
| Naphthalene | 5 |

Examples of materials coming from the distillation of light petroleum oils comprise liquids identified as Solvessos which have boiling point ranges somewhere between approximately 94° C. to 240° C., and solvent naphtha which is a narrow cut boiling between about 135° C. to 155° C. Descriptions of the above-described mixtures of liquid alkylated aromatic hydrocarbons may be found in the book "Industrial Solvents" by Ibert Mellan, published by Reinhold Publishing Corp. (1939) and in the book "Protective and Decorative Coatings," edited by Joseph J. Mattiello, chapter 14B, page 180, and published by the U. S. Printing Office (1945).

Among the saturated, aliphatic, monohydric alcohols which I may use may be mentioned, for instance, n-propyl alcohol, isopropyl alcohol, n-butanol, n-pentanol, t-butyl alcohol, 2-secondary butyl alcohol, 3-methyl-2-butanol, n-hexanol, etc.; ether monohydric alcohols, e. g., β-ethoxyethanol, β-propoxyethanol, β-methoxyethoxyethanol, β-ethoxyethoxyethanol, mixtures thereof, etc. I have obtained good results by employing a liquid dispersing medium comprising, by weight, two parts high-flash naphtha and one part n-butyl alcohol. Preferably, the monohydric alcohol contains from 3 to 6 carbon atoms. I, of course, do not intend to be limited to the particular dispersing phase described herein nor to the particular proportion of liquid ingredients comprising the dispersing phase. Generally, I have found that the saturated, aliphatic, monohydric alcohol may comprise from 5 to 75 per cent, or more, by weight, preferably from 15 to 50 per cent of the total weight of the dispersing phase, namely, the latter and the high-boiling alkylated aromatic hydrocarbon fraction mentioned previously. If more than 75 per cent, by weight, monohydric alcohol is employed, it has been found that electrical conductors coated with such suspensions show less desirable abrasion resistance and electrical properties than when the alcohol is present below this amount. However, in some applications such suspensions may be satisfactory, for example, in impregnating applications.

The proportion of finely divided polymeric chlorotrifluoroethylene to the liquid dispersing medium may be varied within wide limits without departing from the scope of the invention. For example, I may employ, by weight, from 60 to 95 parts of the liquid dispersing medium to from 5 to 40 parts, e. g., 5 to 25 parts, of the polymeric chlorotrifluoroethylene. Expressed on a percentage basis, in some cases I may use an amount of polymer ranging, by weight, from about 1 to 50 per cent, preferably from 5 to 30 per cent of the total weight of a polymer and a dispersing phase. Larger or smaller amounts of polymer and dispersing medium may also be used.

In order that those skilled in the art may better understand how the instant invention may be practiced, the following examples, showing the preparation of various suspensions and their use in coating conductors, are given by way of illustration and not by way of limitation. All parts are by weight.

EXAMPLE 1

*Preparation of dispersion*

Polymeric chlorotrifluoroethylene was run through a hammer mill until a finely comminuted powder was obtained. About 15 parts of the polymer powder was mixed with 85 parts of a liquid dispersing medium, two-thirds of which, by weight, was high-flash naphtha and one-third n-butyl alcohol. This mixture was thereafter placed in a pebble mill and milled for about 168 hours.

EXAMPLE 2

*Treatment of electrical conductors*

Various electrical conductor cores in the form of wire were passed through the liquid dispersion of the polymeric chlorotrifluoroethylene at the rate of about 8 to 10 feet per minute, and thereafter the coated conductor was led into an oven whose temperature at the entrance end was about 150° C. and at the exit end about 500° C. In each case, the conductor was led into the dispersion and oven several times until an approximately two mils thickness of polymeric chlorotrifluoroethylene was obtained. Each of the insulated conductors was of the order of from about 32 to 39 mils in diameter.

One of the electrical conductors coated in the manner described above was a solid aluminum wire of about 32 mils diameter which was coated with a two mil thickness of polymeric chlorotrifluoroethylene by passing the conductor eight times through the polymer dispersion and the oven to give an insulated conductor having a total diameter of 36 mils.

Another conductor coated as described above comprised copper wire of about 25 mils diameter which was passed through molten aluminum and thereafter through a die to give a 5 mil thick aluminum sheath on the copper core. The copper wire was first cleaned in a strong alkali solution such as an aqueous sodium hydroxide solution, and later in a sulfuric acid solution to give a bright, shiny, copper surface free of oxide, and thereafter washed with water to remove all traces of acid. While drawing the copper core through the molten aluminum, the aluminum bath was blanketed with an atmosphere comprising nitrogen containing a small amount of hydrogen to prevent oxidation of the copper.

An additional insulated electrical conductor was prepared by anodizing an aluminum plated copper core by passing it through an anodizing medium such as a solution of oxalic acid, chromic acid, sulfuric acid, caustic (NaOH), etc., suitably arranged to make the conductor the anode in the anodizing bath. Such treatment resulted in the formation of an oxide coating on the aluminum. This particular electrical conductor was also coated with the polymeric chlorotrifluoroethylene by passing the conductor through a dispersion of the resin in the manner described previously.

Another electrical conductor was prepared by passing aluminum wire through a 10 per cent aqueous hydrogen fluoride solution and drying the wire. This resulted in an aluminum surface having a film of aluminum fluoride thereon.

EXAMPLE 3

Testing of coated electrical conductors

Each of the coated, i. e., insulated, electrical conductors prepared as in Example 2 was tested for heat-aging, flexibility, and abrasion resistance. The abrasion resistance test on each insulated conductor was conducted as follows:

A round steel needle, about 18 mils in diameter, was placed perpendicular to each conductor being tested and was set into a reciprocating motion against the surface of the insulation while applying a weight against the needle. A voltage was applied between the needle and the electrical conductor so that when the insulation was broken through, a short developed which stopped the scraping action and shut off the apparatus recording the number of scrapes. A more complete description of this apparatus may be found in the General Electric Review, volume 45, page 285 (1942), published by the General Electric Company at Schenectady, New York.

The heat-aging and flexibility tests on the solid conductors were carried out by placing the insulated conductors in an oven maintained at an elevated temperature for a certain period of time. At the end of this time, the conductor was removed and the insulation was examined to determine if there had been any color change. In addition, each heat-aged conductor was bent around a mandrel of small diameter to determine the flexibility of the insulation after heat-aging and to establish the minimum diameter around which the insulated conductor could be bent without developing cracks or peeling of the insulation.

The insulated solid aluminum electrical conductor did not show any evidence of cracking when it was bent around a 32 mil diameter after being heat-aged at 200° C. for 165 hours or 250° C. for 24 hours. In addition, the color of the insulation had not changed during the heat-aging process. The abrasion resistance test of this insulated conductor showed that 24 strokes of the steel needle were required before the insulation was broken through. Essentially the same results were obtained in the case of the electrical conductor comprising the copper core containing an outer surface of aluminum superimposed between the copper and the polymeric chlorotrifluoroethylene insulation, and in the case of the aluminum wire having the aluminum fluoride surface.

With regard to the electrical conductor comprising a copper core and having the anodized aluminum surface between the copper core and the polymeric chlorotrifluoroethylene insulation, it was found that this conductor was as heat resistant as the two aforementioned electrical conductors comprising solid aluminum and aluminum over the copper core. However, it was most unexpected to find that the abrasion resistance of the electrical conductor containing the anodized aluminum surface was the highest of any tested. Thus, it was found that about 100 strokes of the steel needle were required before the conductor failed.

EXAMPLE 4

In this example, finely comminuted polymeric chlorotrifluoroethylene (average particle size about 0.5 to 5 microns) was mixed with high-flash naphtha and n-butanol in varying proportions and milled in a pebble mill for about four days, to yield a homogeneous stable suspension. The following Table I shows the ingredients used and the proportions of such ingredients:

TABLE I

| Sample No. | Parts Ground Polymer | Dispersing Phase | Weight of Dispersing Phase Components Parts |
|---|---|---|---|
| 1 | 1 165 | High-flash naphtha 2 | 626 |
|   |       | n-Butanol | 209 |
| 2 | 1 180 | High-flash naphtha | 615 |
|   |       | n-Butanol | 205 |
| 3 | 3 200 | High-flash naphtha | 600 |
|   |       | n-Butanol | 200 |
| 4 | 4 180 | High-flash naphtha | 615 |
|   |       | n-Butanol | 205 |

1 No strength temperature of about 245° C.
2 Boiling point range about 140°–190° C.
3 No strength temperature of about 270° C.
4 No strength temperature of about 305° C.

Cadmium-plated copper conductors in the form of magnet wire were passed through the suspensions 1, 2, and 4 and through a baking oven whose air temperatures varied from about 250° C. to 425° C. Each conductor was passed through the suspension and oven five times. The speed of passage varied from about 30 to 60 seconds per pass. The following Table II shows the properties of the conductors coated with the polymeric chlorotrifluoroethylene derived from the respective suspensions:

TABLE II

| Suspension Sample No. | Abrasion Resistance Strokes | Dielectric Strength, Kv. | Build, Mils | Thermal Life Hours 250° C. |
|---|---|---|---|---|
| 1 | 11 | 0.2 | 0.9 | 21 |
| 2 | 2 | 2.2 | 4.6 | 21–29 |
| 4 | 3 | 0.7 | 2.2 | 29 |

The electrical conductors coated with suspension Samples Nos. 1, 2, and 4 all had smooth, continuous, flexible surfaces.

EXAMPLE 5

In this example, a mixture comprising, by weight, 18 per cent of finely divided polymeric chlorotrifluoroethylene (no strength temperature of about 245° C.) and 55 per cent high-flash naphtha (boiling point range 135° to 185° C.) and 27 per cent butyl alcohol was milled in a ball mill for 7 days to give a stable, homogeneous suspension. Solid 32-mil diameter aluminum wire, 25-mil diameter nickel-plated copper wire, and 32-mil diameter surface-anodized aluminum wire were each passed through the suspension prepared above using the same procedure as in Example 2 to deposit a 2.5 mil increase in diameter of polymer on the wire. Thereafter, each coated wire was tested for abrasion resistance, dielectric strength, flexibility, and heat-aging with the following results:

TABLE III

| Wire Used | Abrasion Resistance Strokes | Dielectric Strength, volts/mil | Abrasion Resistance After Heat-aging at 175° C. for 100 Days Strokes |
|---|---|---|---|
| Aluminum | 8 | 1,100 | 6 |
| Anodized aluminum | 26 | 500 | 8 |
| Nickel-plated copper | 3 | 1,020 | 0 |
| Aluminum [1] | 7 | 1,010 | 7 |
| Aluminum [2] | 1 | 1,700 | Less than 1 |

[1] Polymer had no strength temperature of about 305° C.
[2] Used polymeric tetrafluoroethylene.

All the conductors exhibited good flexibility.

EXAMPLE 6

A suspension of 20 per cent, by weight, polymeric chlorotrifluoroethylene (no strength temperature of about 245° C.) and a dispersing phase of 26 per cent butyl alcohol and 54 per cent solvent naphtha (boiling point range 135° to 155° C.) was prepared using the same procedure as in Example 1. A 32-mil diameter aluminum wire was coated with the suspension and found to have an abrasion resistance of seven strokes and a dielectric strength of 1000 volts/mil. The flexibility of the coated conductor was good.

EXAMPLE 7

In this example, the same ingredients and proportions of ingredients were used as in Example 6 with the exception that 54 per cent, by weight, Solvesso 150 (boiling point range 140° to 200° C.) was employed in place of the solvent naphtha. The suspension was also prepared in the same way. 36-mil diameter aluminum wire treated with this suspension gave an insulated conductor whose properties were essentially the same as those of the insulated aluminum wire in Example 5.

In general, it is desirable to grind the polymeric chlorotrifluoroethylene (which may be any high molecular weight solid polymer), for instance, in a micropulverizer, to a fine size, for example, of the order of about 0.2 to 25 microns average particle size before addition of the dispersing phase. Thereafter, the finely divided polymer and the liquid dispersing phase are mixed together and again ground in a pebble mill or in a ball mill for several days. Where the original polymer has been reduced to a fairly fine particle size, it may not be necessary to grind the polymer and dispersing phase for more than 24 to 72 hours. No heating is necessary at any time for making the suspensions. The time required for ball mill grinding to give a satisfactory stable suspension may range from about ½ to 15 days or more and advantageously from about 1 to 8 days.

My invention has eminent utility in various applications where the outstanding heat resistance and chemical resistance of the polymeric chlorotrifluoroethylene can be utilized. Electrical conductors insulated with chlorotrifluoroethylene are capable of withstanding temperatures of the order of from about 150° to 200° C. for long periods of time with little change in the physical characteristics or the insulating properties of the polymeric insulation. Such polymeric material also finds many applications where its high softening point is an advantage. Thus, it is possible to mold objects from the polymeric chlorotrifluoroethylene, either with or without fillers, to give useful articles which are dimensionally stable over a wide temperature range.

By means of my invention of making stable homogeneous dispersions, it is possible to obviate certain difficulties heretofore encountered when trying to make solutions of polymeric chlorotrifluoroethylene because of the latter's substantial insolubility in many of the common organic solvents. The dispersing phases employed in the practice of my invention permit the preparation of stable suspensions, whereas heretofore such stability had not been attained due apparently to the dispersing phases used.

Suspensions made in accordance with my above-described methods are uniformly stable over long periods of time. In addition, even if there should be some slight settling out of the suspended polymeric material, it is possible by mere stirring either prior to use or during use to reinstate the suspension to its originally acceptable form.

In addition to the uses described above as insulation for electrical conductors, my claimed suspensions of polymeric chlorotrifluoroethylene may also be employed in other uses. For instance, they may be used for coating and impregnating various fillers, such as, for example, glass cloth, glass batting, asbestos cloth, mica, etc. If desired, the suspensions may be advantageously employed in making molding compositions by adding to the suspensions various inert inorganic fillers to obtain a homogeneous mixture and thereafter removing the liquid dispersing phase therefrom. Laminated products may also be prepared by coating and impregnating sheet material and superposing layers of the impregnated and coated material and pressing the total assembly under heat and pressure to obtain fusing of the polymer and to give a homogeneous article. In some coating applications, as, for instance, in the coating of electrical conductors such as magnet wire, it has been found advantageous to add varying amounts, for example, from 1 to 10 per cent, by weight, or more of a finely divided pigment or filler to the suspensions. Among such pigments and fillers which may be employed are, for example, calcium carbonate, barium sulfate, talc, muscovite mica, sodium fluosilicate, calcium fluoride, etc.

What I claim as new and desire to secure by Letters Patent of the United States is:

1. A polymeric suspension comprising (1) a dispersed phase comprising polymeric chlorotrifluoroethylene and (2) a dispersing medium for (1) comprising (a) a liquid saturated aliphatic monohydric alcohol and (b) an organic, liquid mixture comprising essentially alkylated aromatic hydrocarbons.

2. A polymeric suspension comprising (1) a dispersed phase comprising polymeric chlorotrifluoroethylene and (2) a dispersing medium for (1) comprising (a) a liquid saturated aliphatic monohydric alcohol and (b) an organic, liquid mixture comprising essentially alkylated aromatic hydrocarbons obtained in the cracking of various coal tar fractions.

3. A polymeric suspension comprising (1) a dispersed phase comprising polymeric chlorotrifluoroethylene and (2) a dispersing medium for (1) comprising (a) a liquid saturated aliphatic monohydric alcohol and (b) an organic, liquid mixture comprising essentially alkylated aromatic hydrocarbons obtained in the hydroforming of select petroleum fractions.

4. A polymeric suspension comprising (1) a dispersed phase comprising polymeric chlorotrifluoroethylene and (2) a dispersing medium for (1) comprising (a) n-butanol and (b) an organic, liquid mixture comprising essentially alkylated aromatic hydrocarbons obtained in the cracking of various coal tar fractions.

5. A polymeric suspension comprising (1) a dispersed phase comprising polymeric chlorotrifluoroethylene and (2) a dispersing medium for (1) comprising (a) n-butanol and (b) an organic, liquid mixture comprising essentially alkylated aromatic hydrocarbons obtained in the hydroforming of select petroleum fractions.

6. A polymeric suspension comprising (1) a dispersed phase consisting of polymeric chlorotrifluoroethylene and (2) a dispersing medium for (1) comprising (a) n-butanol and (b) an organic, liquid mixture of alkylated benzenes obtained in the cracking of coal tar fractions and having a boiling point range of from about 135° to 185° C.

7. A polymeric suspension comprising (1) a dispersed phase consisting of polymeric chlorotrifluoroethylene and (2) a dispersing medium for (1) comprising (a) n-butanol and (b) an organic, liquid mixture of alkylated benzenes obtained in the hydroforming of select petroleum fractions and having a boiling point range of from about 135° to 155° C.

8. A polymeric suspension comprising (1) a dispersed phase consisting of polymeric chlorotrifluoroethylene and (2) a dispersing medium for (1) comprising (a) the monoethyl ether of ethylene glycol and (b) an organic, liquid mixture of alkylated benzenes obtained in the cracking of coal tar fractions and having a boiling point range of from about 140° to 200° C.

9. A stable suspension comprising, by weight, (1) from 5 to 40 parts of a dispersed phase of polymeric chlorotrifluoroethylene and (2) from 60 to 95 parts of a dispersing medium for (1) comprising (a) n-butanol and (b) an organic, liquid mixture of alkylated benzenes obtained in the cracking of various coal tar fractions wherein the n-butanol comprises from 5 to 75 per cent, by weight, of the total weight of the dispersing phase.

10. A polymeric suspension comprising (1) a dispersed phase consisting of polymeric chlorotrifluoroethylene and (2) a dispersing phase for (1) comprising (a) n-butanol and (b) an organic, liquid mixture of alkylated benzenes obtained in the distillation and hydroforming of select petroleum fractions having a boiling point range of from about 140° to 200° C.

11. The method of making a polymeric suspension which comprises (1) forming a mixture of ingredients comprising (a) finely divided polymeric chlorotrifluoroethylene and (b) a dispersing medium for (a) comprising (A) a liquid saturated aliphatic monohydric alcohol and (B) an organic, liquid mixture comprising essentially alkylated aromatic hydrocarbons, and (2) grinding the aforementioned mixture of ingredients until a homogeneous stable suspension is obtained.

12. The method of making a polymeric suspension which comprises (1) forming a mixture of ingredients comprising (a) finely divided polymeric chlorotrifluoroethylene and (b) a dispersing medium for (a) comprising (A) a liquid saturated aliphatic monohydric alcohol and (B) an organic, liquid mixture comprising essentially alkylated aromatic hydrocarbons obtained in the cracking of various coal tar fractions, and (2) grinding the aforementioned mixture of ingredients until a homogeneous stable suspension is obtained.

13. The method of making a polymeric suspension which comprises (1) forming a mixture of ingredients comprising (a) finely divided polymeric chlorotrifluoroethylene and (b) a dispersing medium for (a) comprising (A) a liquid saturated aliphatic monohydric alcohol and (B) an organic, liquid mixture comprising essentially alkylated aromatic hydrocarbons obtained in the hydroforming of select petroleum oil fractions, and (2) grinding the aforementioned mixture of ingredients until a homogeneous stable suspension is obtained.

14. The method of making a polymeric suspension which comprises (1) forming a mixture of ingredients comprising (a) finely divided polymeric chlorotrifluoroethylene and (b) a dispersing medium for (a) comprising (A) n-butanol and (B) an organic, liquid mixture comprising essentially alkylated aromatic hydrocarbons obtained in the cracking of various coal tar fractions, and (2) grinding the aforementioned mixture of ingredients until a homogeneous stable suspension is obtained.

15. The method of making a polymeric suspension which comprises (1) forming a mixture of ingredients comprising (a) finely divided polymeric chlorotrifluoroethylene and (b) a dispersing medium for (a) comprising (A) n-butanol and (B) an organic, liquid mixture comprising essentially alkylated aromatic hydrocarbons obtained in the hydroforming of select petroleum oil fractions, and (2) grinding the aforementioned mixture of ingredients until a homogeneous stable suspension is obtained.

16. The method of making a polymeric suspension which comprises (1) forming a mixture of ingredients comprising (a) finely divided polymeric chlorotrifluoroethylene and (b) a dispersing medium for (a) comprising (A) n-butanol and (B) an organic, liquid mixture comprising essentially alkylated aromatic hydrocarbons obtained in the cracking of various coal tar fractions and having a boiling point range of from about 135° to 185° C., and (2) grinding the aforementioned mixture of ingredients until a homogeneous stable suspension is obtained.

17. The method of making a polymeric suspension which comprises (1) forming a mixture of ingredients comprising (a) finely divided polymeric chlorotrifluoroethylene and (b) a dispersing medium for (a) comprising (A) n-butanol and (B) an organic, liquid mixture comprising essentially alkylated aromatic hydrocarbons obtained in the hydroforming of select petroleum oil fractions and having a boiling point range of from about 135° to 155° C., and (2) grinding the aforementioned mixture of ingredients until a homogeneous stable suspension is obtained.

18. The method of making a polymeric suspension which comprises (1) forming a mixture of ingredients comprising (a) finely divided polymeric chlorotrifluoroethylene and (b) a dispersing medium for (a) comprising (A) the monoethyl ether of ethylene glycol and (B) an organic, liquid mixture of alkylated benzenes obtained in the cracking of coal tar fractions and having a boiling point range of from about 140° to 200° C., and (2) grinding the aforementioned mixture of ingredients until a homogeneous stable suspension is obtained.

19. The method of making a polymeric suspension which comprises (1) forming a mixture of ingredients comprising (a) finely divided polymeric chlorotrifluoroethylene and (b) a dispersing medium for (a) comprising (A) n-butanol and (B) an organic, liquid mixture comprising essentially alkylated aromatic hydrocarbons obtained in the hydroforming of select petroleum oil fractions and having a boiling point range of from about 140° to 200° C., and (2) grinding the aforementioned mixture of ingredients until a homogeneous stable suspension is obtained.

20. The method of making a polymeric suspension which comprises (1) forming a mixture of ingredients comprising by weight (a) from 5 to 40 parts of finely divided polymeric chlorotrifluoroethylene and (b) from 60 to 95 parts of a mixture of ingredients comprising (A) n-butanol and (B) an organic, liquid mixture of alkylated benzenes obtained in the cracking of various coal tar fractions wherein the n-butanol comprises from 5 to 75 per cent, by weight, of the total weight of (A) and (B), and (2) grinding the aforementioned mixture of ingredients until a homogeneous stable suspension is obtained.

GERALD W. YOUNG.

REFERENCES CITED

The following references are of record in the file of this patent:

UNITED STATES PATENTS

| Number | Name | Date |
|---|---|---|
| 2,393,967 | Brubaker | Feb. 5, 1946 |
| 2,412,960 | Berry | Dec. 24, 1946 |
| 2,448,952 | Berry | Sept. 7, 1948 |
| 2,484,483 | Berry | Oct. 11, 1949 |